United States Patent [19]
Arndt et al.

[11] Patent Number: 4,463,032
[45] Date of Patent: Jul. 31, 1984

[54] METHOD FOR MAKING BLOCK-RESISTANT SOFT POLYMER BEADS

[75] Inventors: Peter J. Arndt, Seeheim-Jugenheim; Werner Siol, Darmstadt; Walter Ludwig, Bensheim; Franz Wenzel, Darmstadt, all of Fed. Rep. of Germany

[73] Assignee: Röhm GmbH, Darmstadt, Fed. Rep. of Germany

[21] Appl. No.: 448,406

[22] Filed: Dec. 9, 1982

[30] Foreign Application Priority Data

Dec. 22, 1981 [DE] Fed. Rep. of Germany ....... 3150730

[51] Int. Cl.$^3$ .................. B05D 7/00; C12P 33/14; C12P 33/08
[52] U.S. Cl. .................................. 427/222; 428/407; 521/57; 521/59
[58] Field of Search .................. 427/222; 521/57, 59, 521/60; 428/407

[56] References Cited

U.S. PATENT DOCUMENTS 2,448,524  9/1948  Gentner ..................... 427/222 X
3,102,050  8/1963  Canterino et al. ............ 427/222
3,911,193  10/1975 Resz et al. .................. 428/407
4,097,553  6/1978  Novak ....................... 260/876 R
4,307,134  12/1981 Milkovich et al. ............ 427/222
4,333,970  6/1982  Blommers et al. ............. 427/222
4,368,218  1/1983  Senda et al. ................ 427/222

FOREIGN PATENT DOCUMENTS 2148224  4/1973  Fed. Rep. of Germany .
54-65791  5/1979  Japan.

OTHER PUBLICATIONS

Chemical Abstracts 91, 124683y (1979).
"Polymer Handbook", Brandrup/Immergut, Interscience Publishers, New York, 1966, (selected pages).
"Kunststoff-Handbuch", Carl Hanser Verlag, Munich, 1975, p. 339.

Primary Examiner—Michael R. Lusignan
Attorney, Agent, or Firm—Curtis, Morris & Safford

[57] ABSTRACT

What are disclosed are a method for making non-blocking soft polymer beads by applying an adherent polymer deposit on the beads, said deposited polymer having a glass transition temperature at least 10° C. higher than the glass transition temperature of the soft polymer beads, which latter temperature is below 70° C., and non-blocking soft polymer beads made by this method.

14 Claims, No Drawings

METHOD FOR MAKING BLOCK-RESISTANT SOFT POLYMER BEADS

The present invention relates to a method for making non-blocking soft polymer beads and to the bead polymers produced by said method.

Polymers in bead form are conventionally produced by the bead (suspension) polymerization method. With this method, the monomers (disperse phase) are dispersed in a non-solvent (continuous phase) by mechanical action (agitation) and polymerized in that form. The polymer so formed is largely soluble in the monomers. Under the influence of the surface tension, the monomers form spherical droplets. To keep the droplet form intact during polymerization and to prevent the coalescence of droplets, so called dispersing agents or dispersants (protective colloids) are added to the polymerization mixture. These are preferably substances which on completion of polymerization can be completely separated from the polymer which is obtained in bead form.

The dispersant has the effect of stabilizing the monomer droplets, once formed, to the extent that agglomeration of the droplets is practically prevented.

Water usually is the continuous phase. Monomers suited for polymerization therefore are primarily monomers which are difficultly soluble or insoluble in water and are susceptible to free radical polymerization. [See Houben-Weyl, 4th ed. vol. XIV/1 (1961), "Makromolekulare Stoffe" (Macromolecular Substances), pp. 406–433, G. Thieme-Verlag.] This is true, for example, of styrene and its substituted derivatives, vinyl esters of carboxylic acids such as vinyl acetate, esters of acrylic and methacrylic acid, vinyl chloride, vinylidene chloride, and N-vinylcarbazole.

Suitable dispersants are the water insoluble salts of inorganic acids, such as barium sulfate or barium carbonate, or high molecular weight natural substances or synthetic polymers. High molecular weight dispersants include water soluble colloids such as polyvinyl alcohol, partially saponified polyvinyl acetate, methylcellulose, starch, gelatin, pectin, the alkali metal salts of polyacrylic acid or alkali metal salts of copolymers formed between styrene or vinyl acetate and maleic anhydride, etc. (See Houben-Weyl, loc. cit., pp. 411–430.) The ratio of the aqueous phase to the monomer phase usually is from 2:1 to 4:1. In contrast to emulsion polymerization, the initiators used in bead polymerization are substantially soluble in the monomers but insoluble in water. The amount of initiator generally ranges from 0.1 to 1 weight percent and preferably is about 0.5 weight percent, based on the monomers. The bead size can be held to between 0.01 mm and a few millimeters, depending on the requirements.

While process engineering for bead polymerization has undergone many modifications and has been optimized by being tailored to the desired bead polymers, the products obtained still leave much to be desired in some respects.

The problems involved, which may have important practical consequences, will now be described with reference to bead polymers of esters of acrylic or methacrylic acid. The most important monomer for acrylic resin beads is methyl methacrylate. If other methacrylate esters (see U.S. Pat. No. 2,440,808) or acrylate esters (see U.S. Pat. No. 2,171,765) are polymerized, beads ranging from soft to tacky are obtained, depending on the softening point, which is why these esters are often used only as comonomers along with other acrylic acid or methacrylic acid compounds such as the acids themselves, their amides and nitriles, or divalent monomers such as acid anhydrides. [See H. Rauch-Puntigam and Th. Voelker in "Acryl- und Methacrylverbindungen" (Acrylic and Methacrylic Compounds), Springer-Verlag, 1967, p. 210.]

The terms "hardness" and "softness" as applied to a polymer are only idiomatic expressions for one of a number of physical properties which may affect the technical suitability of polymers. Other important properties are molecular weight and heat sealability, for example. In practice, this frequently gives rise to the problem alluded to above, namely that bead polymers may meet requirements for technical uses well or even optimally with regard to their physical and chemical properties except for the "softness" of the beads, which "softness" manifests itself in an unfortunate tendency to block.

For one thing, this means difficulties in drying. For example, in practice, drying-air temperatures must often be maintained which militate against a rational drying process. In some cases, such "soft" polymers cannot be produced or transported during the hot season or in countries having a high average temperature.

The "hardness" of homopolymers formed from the various industrially used monomers can be presumed to be known. One measure thereof is the glass transition temperature, $T_g$, for example, which, determined dilatometrically, depends to some extent also on the molecular weight of acrylic polymers. Another is the dynamic glass transition temperature, $T_{g\,max}$, determined in conformity with DIN 53 445 [see Esser-Vieweg, "Kunststoff-Handbuch" (Plastics Handbook), vol. IX, Polymethacrylate, Hanser, 1975, pp. 333–339 et seq., and Brandrup-Immergut, "Polymer Handbook"], which as a rule is 30±5° C. higher than the glass transition temperature. Under the usual definitions, a monomer is regarded as "hard" when the glass transition temperature of a homopolymer made from it is above 30° C.

In the case of copolymers, the resultant glass transition temperature can be derived from the individual values for the monomers. [See T. G. Fox, Bull. Am Phys. Soc. 1, 123 (1956).]

Thus, there has been a need to make non-blocking "soft" bead polymers available. For the purposes of the present application, "soft" bead polymers are polymers and copolymers whose glass transition temperature is below 70° C. More particularly, the present application relates to bead polymers whose glass transition temperature is less than 50° C. These include, in particular, copolymers of methyl methacrylate, which in itself is hard ($T_g$ of PMMA=105° C.), with softer comonomers, for example esters of methacrylic acid with $C_2$ to $C_{24}$ alcohols or esters of acrylic acid with $C_1$ to $C_{24}$ alcohols. Comonomers which are frequently used industrially are ethyl acrylate, 2-ethylhexyl acrylate, isobutyl methacrylate, and n-butyl methacrylate, for example.

Specifically, copolymers of methyl methacrylate and butyl methacrylate ($T_g$ of poly-n-butyl methacrylate=20° C.), ethyl acrylate ($T_g$ of polyethyl acrylate=−24° C.), methyl acrylate ($T_g$ of polymethyl acrylate=+10° C.), butyl acrylate ($T_g$ of polybutyl acrylate=−45° C.), and 2-ethyl hexyl acrylate ($T_g$ of poly-2-ethylhexyl acrylate=−55° C.) should be mentioned, as should polymers containing no methyl methacrylate, for example those comprising isobutyl methacrylate ($T_g$ of polyisobutyl methacrylate=53° C.) or butyl methacrylate ($T_g$ of poly-n-butyl methacrylate = 20° C.), which polymers may further contain other esters of acrylic acid and/or methacrylic acid. Further, other "soft" polymers are the homopolymers of monomers which in themselves are soft, such as polymethyl acrylate or polybutyl methacrylate, and copolymers of these soft monomers with one another. The polymers may further contain functional or water soluble monomers of acrylic acid or of methacrylic acid, phenyl esters, optionally substituted amides of acrylic acid and/or of methacrylic acid, methacrylonitrile and/or acrylonitrile, as well as styrene and its derivatives, vinyl carboxylates such as vinyl acetate, etc. Suitable water soluble or hydrophilic components are, for example, monomers containing hydroxyl groups. [See Rauch-Puntigam, "Acryl- und Methacrylverbindungen" (Acrylic and Methacrylic Compounds), Springer Verlag, 1967, pp. 102–129.] Examples thereof are the hydroxyalkyl esters of acrylic acid or of methacrylic acid. In addition, the bead polymers used according to the invention may contain crosslinking monomers, but, as a rule, are free of external plasticizers.

The limitation here is obvious: These components will not determine the hardness of the overall polymer to the extent that, a priori, blocking will not occur, or will not influence water solubility to an extent that no further bead polymer can be obtained. As a rule, the proportion of the "hard" monomers, including methyl methacrylate, should not exceed 80 weight percent, based on the total polymer. The proportion of the hydrophilic or water soluble monomers will generally be less than 20 weight percent, and more particularly less than 5 weight percent, based on the total polymer. As pointed out earlier, the resulting hardness depends on the overall system, so that while it is possible to specify an approximate range for the "hard" monomers, the relative proportions may vary considerably within that range depending on the type and relative amounts of the comonomers.

In addition, the bead polymer may contain crosslinking monomers, that is compounds having at least two reactive groups in the molecule. Suitable reactive groups are, in particular, vinyl and vinylidene groups, (blocked) amidomethylol groups, carbamidomethylol groups, carbamidomethyl ether groups, azlactone groups, and epoxy groups. Particular crosslinking monomers are, for example, the acrylate and methacrylate esters of polyhydric alcohols, such as glycol diacrylate and dimethacrylate, 1,3- and 1,4-butanediol diacrylate and dimethacrylate, trimethylolpropane triacrylate and trimethacrylate, tetraethylene glycol diacrylate and dimethacrylate, etc; N-methylol acrylamide and methacrylamide; methylene(bis)-acrylamide and (bis)methacrylamide; glycidyl acrylate and methacrylate; and allyl compounds such as allyl acrylamide and methacrylamide, triallyl cyanurate, and the like. These are usually used in small amounts, for example, from 0.05 to 2 weight percent, based on the total monomers.

It has now been found that non-blocking bead polymers, in other words, bead polymers which will not stick to one another or to other surfaces, can also be produced from beads which in themselves are "soft" if the beads are treated with an organic polymer dispersion that forms a non-blocking deposit on the surface of the beads.

The effectiveness of the polymer dispersions suitable for use in accordance with the invention is based on the fact that the deposits themselves do not block, that is to say, are "hard". In other words, their glass transition temperature, $T_g$, generally is greater than 40° C., and preferably greater than 50° C. Obviously, to improve the anti-blocking properties of a less soft bead, for example a bead polymer having a glass transition temperature of 60° C., a deposit having a fairly high glass transition temperature, for example, 80° C., will have to be used. As a rule, the glass transition temperature of the deposit will be at least 10° C. higher than that of the bead polymer.

The object of the present invention can be accomplished with both film forming and non-film forming polymer dispersions, provided that the deposits possess the necessary hardness. Film forming dispersions formulated to be "hard" will leave a hard protective film as a deposit on the individual polymer beads. With hard polymer dispersions which do not form a film, beads are obtained which when observed under the microscope appear to be coated with a "dispersion powder".

A deposit from 0.2 to 20 weight percent, and preferably from 0.5 to 5 weight percent, of solids, based on the beads as solids, will generally suffice to render the beads non-blocking. By definition, suitable polymer dispersions are those which will form a deposit of the requisite hardness on the beads.

Certain criteria may be useful in the selection of polymer dispersions suited for rendering polymer beads non-blocking. For example, the polymer deposited from the polymer dispersion should have as little effect on the end use of the bead polymers as possible.

This is where the special advantage of the process of the invention for rendering bead polymers non-blocking manifests itself. In the prior art methods for rendering bead polymers tack free, calcium stearate (Japanese patent application No. 79 65, 701) for example, or disodium adipate in combination with sodium lauryl sulfate (U.S. Pat. No. 2,448,524), are used. Another widely used method for rendering surfaces tack free consists in the addition of very finely divided silica. However, in all these cases properties affecting use of the beads, for example the solubility of the beads so treated, are definitely altered. This drawback can be overcome by using polymer dispersions to render beads non-blocking.

Moreover, the polymer dispersions preferably are of the same polymer class as the polymer beads. Thus, with bead polymers comprising acrylates, acrylate dispersions are preferably used. The acrylate dispersions suited for use in accordance with the invention are known per se. Apart from hardness, similar criteria apply as in the case of bead polymerization. The dispersions are usually composed of a "hard" monomer component, (A), formed from one or more of methyl methacrylate, tert.-butyl methacrylate, ethyl methacrylate, isopropyl methacrylate, isobutyl methacrylate, phenyl methacrylate, styrene and its derivatives such as alpha-methyl styrene, acrylic acid and or methacrylic acid, optionally alkyl-substituted acrylamide or methacrylamide, and acrylonitrile or methacrylonitrile. Component (A) preferably or exclusively contains methyl methacrylate.

The dispersions may also optionally comprise a "softer" monomer component, (B), formed from one or more esters of the formula

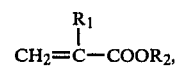

wherein $R_1$ is hydrogen or methyl. If $R_1$ is hydrogen, $R_2$ is alkyl having from 1 to 24, and preferably from 1 to 16, carbon atoms: if $R_1$ is methyl, then $R_2$ is alkyl having from 5 to 24 carbon atoms as well as n-butyl.

The dispersion may also optionally comprise a more hydrophilic component (C) formed from one or more hydrophilic substituted esters of the formula

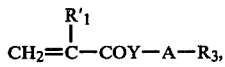

wherein $R'_1$ has the same meaning as $R_1$, Y is oxygen or —NH—, A is linear, branched, or cyclic alkylene having from 1 to 10 carbon atoms, and $R_3$ is hydroxyl, amino optionally substituted by $C_1$ to $C_8$ alkyl, or a corresponding substituted ammonium group, or is heterocyclic. Alternatively, (C) is a monomer of the formula

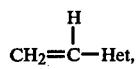

wherein Het is a heterocyclic moiety, preferably pyridine, pyrrolidine, pyrrolidone, imidazole, imidazolidine, or carbazole.

In every case, the amount of component (A) should be sufficiently large, possibly in combination with component (C), to obtain the requisite "hardness" in the resulting dispersion.

In its preferred embodiment, the dispersion should have a glass transition temperature greater than 50° C. Accordingly, the dispersion polymer should contain from 0 to 70 weight percent of the monomers (B), which must be regarded as "soft". ($T_g$ of homopolymers=30° C. or lower.)

Evidently, this upper limit of a 70 weight percent content of monomer (B) in the polymer of the dispersion will be applicable only if the monomers from the group of "soft" monomers are among the harder ones in this group, that is to say, if the homopolymers formed from these monomers have a glass transition temperature approximately equal to room temperature.

When very soft monomers (for example, butyl acrylate, $T_g$ of homopolymer= −45° C.) are used, the upper limit on their amount will be considerably lower. For example, the dispersion polymer should contain not more than 40 weight percent of monomers such as butyl acrylate.

As a rule, the monomers of group (C) should account for not more than 40 weight percent, and preferably for less than 20 weight percent, of the total polymer. According to the hardness of their homopolymers, these monomers will take the place of monomers of group (A), for example of hard, hydrophilic monomers such as methacrylamide or 2-hydroxyethyl methacrylate; if the monomers (C) themselves result in soft homopolymers, as does hydroxybutyl acrylate for example, then they will reduce the amount of the monomers (B).

Moreover, it may be advantageous to adapt properties of the dispersion polymer, other than hardness, to the bead polymer. For example, one way of doing this is to coordinate the composition of the polymer dispersions with that of the bead polymers and to select the auxiliary agents used in the preparation of the dispersions with due regard to their compatibility with the further use to be made of the bead polymers. For example, it may be important that the solubility of the deposited polymers and of the auxiliary agents in non-aqueous solvents approximately corresponds to the solubility of the bead polymers.

For example, dispersions whose monomer composition qualitatively corresponds to or does not substantially differ from that of the polymer beads, but which differs quantitatively in that it has a higher content of one or more "hard" monomers than does the composition of the bead polymer, can be expected to form a well-adhering coating on the latter.

A point of departure for optimization of the dispersions to be used may be that the glass transition temperature of the dispersion should be at least 10° C. higher than that of the bead treated therewith. Usually, however, the glass transition temperature of the dispersion will exceed that of the bead polymer by more than 20° C. (In this connection, see the Examples given in Table 1.)

A smaller difference in the glass transition temperature between bead polymer and dispersion usually permits the use of polymers which are well compatible with each other, while a very big difference in the glass transition temperature provides excellent protection against agglomeration of the particles. The composition of the dispersion will therefore be based on end-use requirements.

The polymer dispersions may be prepared conventionally, advantageously by the emulsion or monomer continuous feed method, with part of the water and the total amount of portions of the initiator and emulsifier making up the initial charge. With these methods, the particle size can be controlled to advantage through the amount of emulsifier in the initial charge. Suitable emulsifiers are primarily anionic and nonionic surface active agents, although cationic surfactants can also be used. Generally, the amount of emulsifier used will not exceed 3 weight percent, and preferably will not exceed 1 weight percent, based on the polymer.

In addition to the compounds commonly used in emulsion polymerization, suitable initiators are, for example, per compounds such as hydrogen peroxide and ammonium persulfate (APS), redox systems such as bisulfite-APS-iron, as well as azo initiators. The amount of initiator will generally range from 0.005 to 0.5 weight percent, based on the polymer.

Within certain limits, the polymerization temperature depends on the initiators. For example when APS is used, the polymerization temperature advantageously ranges from 60° to 90° C. When redox systems are used, the polymerization temperature may be lower, for example, 30° C. In addition to the continuous feed method, the polymerization may be carried out by the batch method. With the latter, the total amount or a portion of the monomers is introduced as the initial charge together with all auxiliary agents and polymerization is then started with the aid of redox initiators. The monomer to water ratio must be adapted to the heat of reaction being liberated. As a rule, no difficulties will be encountered when a 50% emulsion is produced by first emulsifying one-half of the monomers and of the auxiliary agents in the total amount of the water. The polymerization is then started at room temperature. The batch is cooled on completion of the reaction and the remaining half of the monomers and auxiliary agents is then added.

The use of acid sensitive emulsifiers such as the sodium salts of long chain carboxylic acids is particularly advantageous since the dispersion so prepared can then be simply precipitated onto the bead surface. On the other hand, the use of dispersions which have been rendered electrolyte resistant by the presence of large amounts (for example 5%) of emulsifiers is less advantageous.

Dispersions which satisfy the above conditions are listed in Examples 3 to 7, for instance.

The dispersion may be deposited in a wide variety of ways. One way of depositing it is to apply the dispersion, the particles of which may form a film only at elevated temperature, to previously washed beads in a fluidized bed dryer. In another method, the dispersion is applied to the beads with the wash water. Still another method consists of depositing the dispersion on the beads by precipitation, for example, with salts or by the addition of an acid.

In a particularly advantageous method, the dispersions are added to the bead suspension directly on completion of the bead polymerization. When an inorganic dispersant is used, for example, the destruction of the dispersant system can then be combined with the precipitation of the dispersion onto the bead surface. Moreover, the dispersion thus provides protection against agglomeration of the beads already at a very early stage.

The examples which follow serve to illustrate the invention. Examples 1 and 2 are comparative examples in which non-blocking properties are not imparted to bead polymers. Examples 3 to 7 describe the preparation of polymer dispersions and Examples 8 to 16 illustrate the production of beads in accordance with the invention.

EXAMPLE 1 (COMPARATIVE EXAMPLE)

Soft Bead Polymer with Untreated Surface

A solution of 7 g of aluminum sulfate [$Al_2(SO_4)_3.14-H_2O$] in 1000 g of distilled water was charged into a 2-liter polymerization vessel equipped with stirrer, reflux condenser, and thermometer, and heated to 75° C. Aluminum hydroxide, which acts as a dispersing agent, was produced by the addition of 3 g of sodium carbonate dissolved in 30 g of water. Following this, 0.12 g of the sodium salt of a $C_{14}$–$C_{16}$ alkylsulfonic acid and 0.12 g of polyethylene oxide (molecular weight=5,000 to 6,000) were added in the form of a 20% solution in water.

A monomer mixture composed of
- 300 g of methyl methacrylate,
- 200 g of ethyl acrylate,
- 2.5 g of lauroyl peroxide, and
- 2.5 g of ethylhexyl thioglycolate was added to this water phase with vigorous stirring and polymerized for 3 hours at a bath temperature of about 75° C. This was followed by stirring for 1 hour at 85° C. and cooling to room temperature. The inorganic dispersant was then destroyed by the addition of 10 g of about 50% sulfuric acid. The product was filtered by suction and washed three times with 500 ml portions of distilled water. Drying was carried out at room temperature or at a slightly higher temperature, it being advantageous to keep the beads in constant motion to prevent them from fusing together.

Observance of these precautionary measures permits a bead polymer to be obtained which flows readily at a storage temperature of 20° C. With regard to the behavior of this product at higher storage temperatures and under stacking pressure, see Table 1.

EXAMPLE 2 (COMPARATIVE EXAMPLE)

Soft Bead Polymer with Untreated Surface

The same procedure was used as in Example 1 except that the composition of the monomer phase was as follows:
- 400 g of butyl methacrylate,
- 100 g of methyl methacrylate,
- 2.5 g of lauroyl peroxide, and
- 2.5 g of ethylhexyl thioglycolate.

The precautionary measures outlined in Example 1 were observed and a bead polymer was obtained which exhibited free flowing properties only at temperatures of less than 25° C. For evaluation of the flow properties at increased storage temperatures, see Table 1.

EXAMPLE 3

Dispersion for the Production of Bead Polymers

To a Witt jar equipped with reflux condenser, thermometer, and feed vessel, there was charged a solution composed of
- 2 g of ammonium persulfate and
- 0.7 g of triisobutylphenol, sulfated and hydroxyethylated with 6 moles ethylene oxide, sodium salt, in
- 1450 g of water.

This was heated to 80° C. To this charge there was then added dropwise over a period of 4 hours at 80° C. an emulsion composed of
- 5 g of ammonium persulfate,
- 7 g of triisobutylphenol, sulfated and hydroxyethylated with 6 moles of ethylene oxide, sodium salt,
- 5 g of ethylhexyl thioglycolate,
- 2400 g of isobutyl methacrylate, and
- 2180 g of distilled water.

On completion of this addition, the mixture was stirred for 2 hours at 80° C. After cooling to room temperature, a dispersion free of coagulate and readily filterable was obtained. Solids content=39.2%; pH value=2.1; particle diameter=330 nm.

EXAMPLE 4

Dispersion for the Production of Bead Polymers

To a Witt jar equipped with reflux condenser, thermometer, and feed vessel there was charged a solution composed of
- 1.6 g of ammonium persulfate and
- 0.008 g of triisobutylphenol, sulfated and hydroxyethylated with 6 moles of ethylene oxide, sodium salt, in
- 800 g of distilled water.

This was heated to 80° C. To this charge there was then added dropwise over a period of 30 minutes at 80° C. a mixture composed of
- 75 g of methyl methacrylate,
- 75 g of butyl methacrylate,
- 0.15 g of ethylhexyl thioglycolate,
- 0.08 g of the above emulsifier, and
- 0.1 g of water.

Subsequently there was then added dropwise over a period of 210 minutes, also at 80° C., a monomer/emulsifier mixture composed of
- 525 g of methyl methacrylate, 525 g of butyl methacrylate,
1 g of ethylhexyl thioglycolate,
2.5 g of the above emulsifier, and
2.5 g of water.

On completion of this addition, the mixture was stirred for 2 hours at 80° C. Cooling to room temperature was followed by filtration.

A coarsely particulate dispersion was obtained. Solids content=80%; pH value=2.2; viscosity=70 mPa.sec; particle diameter=850 nm.

EXAMPLE 5

Dispersion for the Production of Bead Polymers

The same procedure was used as in Example 3. However, the amounts and types of the auxiliary agents were changed as follows:

| Initial charge: | 1.8 g of the sodium salt of 4,4'-azobis-4-cyano-valeric acid, |
| --- | --- |
| | 3.6 g of sodium laurate, and |
| | 400 g of distilled water |
| Emulsion feed: | 2400 g of isobutyl methacrylate, |
| | 5 g of ethylhexyl thioglycolate, |
| | 5 g of the sodium salt of 4,4'-azobis-4-cyano-valeric acid, |
| | 32 g of sodium laurate, and |
| | 3260 g of distilled water. |

A readily filterable dispersion was obtained. Solids content=40%; pH value=9.6; viscosity=18 mPa.sec; particle diameter=140 nm.

EXAMPLE 6

Dispersion for the Production of Bead Polymers

The same procedure was used as the Example 3. However, the amounts and types of the monomers and auxiliary agents were changed.

| Initial charge: | 0.14 g of nonylphenol, phosphated and hydroxyethylated with 5 moles of ethylene oxide, free acid, |
| --- | --- |
| | 2 g of 4,4'-azobis,4-cyanovaleric acid, |
| | 1.2 g of sodium bicarbonate, and |
| | 1600 g of distilled water |
| Emulsion feed: | 22 g of nonylphenol, phosphated and hydroxyethylated with 5 moles of ethylene oxide, free acid, |
| | 4 g of 4,4'-azobis-4-cyanovaleric acid, |
| | 2.4 g of sodium bicarbonate, |
| | 6 g of ethylhexyl thioglycolate, |
| | 1000 g of ethyl acrylate, |
| | 3000 g of methyl methacrylate, and |
| | 2400 g of distilled water. |

A readily filterable dispersion was obtained. Solids content=50%; pH value=4.3; viscosity=200 mPa.sec; particle diameter=340 nm.

EXAMPLE 7

Dispersion for the Production of Bead Polymers

The same procedure was used as in Example 6. However, the monomer composition and the amount of regulator were changed as follows:

400 g of methyl methacrylate (in place of the mixture of ethyl acrylate and methyl methacrylate), and
3 g of ethylhexyl thioglycolate (in place of 6 g as in Example 6).

A readily filterable dispersion was obtained. Solids content=50%; pH value=4.3.

EXAMPLE 8

Non-blocking Soft Bead Polymer 100 g of the beads produced in accordance with Example 1, washed twice with distilled water but not dried, were suspended in about 100 ml of a 10% dispersion (prepared from 20 g of a dispersion according to Example 6 and 80 g distilled water) and stirred for about 5 minutes. The dispersion was then filtered by suction or centrifuged and the bead polymer was dried in a fluidized bed dryer.

A product was obtained which represented a definite improvement with respect to its non-blocking characteristics over the untreated bead polymer. (See Table 1.)

The filtrate, which contains the major portion of the dispersion unchanged, can be used for the treatment of further bead polymer charges. However, it is advisable to make up for dispersion losses due to deposition on the beads by adding at intervals a dispersion according to Example 6.

EXAMPLE 9

Non-blocking Soft Bead Polymer

The recipe and initial procedure followed in Example 1 were used here, too. Polymerization was carried out for 3 hours at 75° C. and was followed by further heating for 1 hour at 85° C.

However, the further procedure was as follows: The reaction mixture was cooled to about 40° C. At this temperature, 10 g of a dispersion according to Example 6, diluted with 30 g of distilled water, were added. After about 5 minutes stirring at 40° C., 30 g of 10% sulfuric acid were added to destroy the inorganic dispersant and to precipitate the dispersion. Stirring was then continued for about 15 minutes at 40° C. This was followed by cooling to room temperature and filtration by suction. The filtrate was perfectly clear.

The beads were washed twice with 500 ml of distilled water and then dried at room temperature.

A product was obtained which exhibited good flow properties and did not agglomerate even at higher storage temperatures. (See Table 1.)

EXAMPLE 10

Non-blocking Soft Bead Polymer

The polymerization recipe and initial procedure followed in Example 2 were used here, too. Polymerization was carried out for 3 hours at 75° C. and was followed by further heating to 85° C.

However, the further procedure was as follows: The reaction mixture was cooled to 65° C. Then 12.5 g of the dispersion according to Example 3, diluted with three times as much distilled water, was added and the mixture was acidified with 2.5 g 50% sulfuric acid and stirred for 10 minutes at 65° C. This was followed by cooling to 30° C., two washes with 500 ml portions of distilled water, and drying in a fluidized bed dryer at 50° C.

A free flowing powder was obtained which did not agglomerate even at storage temperatures above room temperature. (See Table 1.)

EXAMPLE 11

Non-blocking Soft Bead Polymer

The procedure of Example 10 was followed. However, the emulsifier poor dispersion of Example 4 containing relatively coarse particles was used to produce the beads.

Amount of dispersion added: 12 g (equal to about 7.2 g of dispersed solids).

The dispersion was diluted with three times as much distilled water and added at 65° C. The mixture was then acidified with 30 g of a 12% sulfuric acid solution and stirred for 10 minutes at 65° C. After cooling, suction filtering, washing, and drying as described in Example 10, a free flowing bead polymer was obtained which did not agglomerate even at a storage temperature of 40° C.

EXAMPLE 12

Non-blocking Soft Bead Polymer

The same procedure was used as in Example 1. However, the monomer phase was composed as follows:
500 g of butyl methacrylate,
2.5 g of lauroyl peroxide, and
2.5 g of ethylhexyl thioglycolate.
Polymerization was carried out for 3 hours at 75° C. and was followed by stirring for 1 hour at 85° C. The batch was then cooled to 30° C. and 20 g of the dispersion of Example 7 were added after first having been diluted with 40 g of distilled water. After acidification with 50 g of 12% sulfuric acid, the batch was stirred for another 15 minutes at 30° C. and then cooled to 20° C., filtered with suction, washed twice with 500 ml portions of distilled water, and dried in a fluidized bed dryer. Free flowing beads were obtained which did not agglomerate even at an elevated storage temperature (45° C.). (See Table 1.)

EXAMPLE 13

Non-blocking Soft Bead Polymer

The same procedure was used as in Example 12. However, the monomer phase was composed as follows:
300 g of ethyl acrylate,
200 g of methyl methacrylate,
2.5 g of lauroyl peroxide, and
2.5 g of ethylhexyl thioglycolate.
The beads were produced as in Example 12 by the addition of 20 g of the dispersion of Example 7.

Free flowing beads were obtained which did not agglomerate even at an elevated storage temperature (44° C.). (See Table 1.)

EXAMPLE 14

Non-blocking Soft Bead Polymer

A solution of 7 g of aluminum sulfate [$Al_2(SO_4)_3 \cdot 14H_2O$] in 1000 g of distilled water was charged to a 2-liter polymerization vessel equipped with stirrer, reflux condenser, and thermometer, and heated to 75° C. The pH value was adjusted to 5.8 by the addition of about 3.3 g of soda dissolved in 30 g of water. 0.12 g of the sodium salt of $C_{14}$–$C_{16}$ alkylsulfonic acid and 0.12 g of a polyethylene oxide (molecular weight=5,000 to 6,000) were then added.

A monomer mixture composed of
200 g of vinyl acetate,
200 g of methyl acrylate,
3 g of lauroyl peroxide, and
1.5 g of ethylhexyl thioglycolate
was added to this water phase with vigorous stirring. Polymerization was carried out for 2 hours at a bath temperature of 72° C., followed by cooling to 25° C. After the addition of 16 g of the dispersion of Example 7, diluted with 50 g water, and then of 30 g of 10% sulfuric acid, the batch was stirred for 10 minutes at 25° C. After cooling to 20° C., the beads were allowed to settle, following which they were suspended in 2 liters of distilled water. The suspension was then decanted and the residue was again suspended in 2 liters of distilled water. The product was then filtered off by suction. This was followed by washing with 500 ml of distilled water.

After drying at room temperature, a free flowing bead polymer was obtained. (See Table 1.)

EXAMPLE 15

Non-blocking Soft Bead Polymer

The water phase was prepared as described in Example 1 in a 2-liter polymerization vessel. To it there was then added with vigorous stirring a monomer phase composed of
400 g of methyl acrylate,
3 g of lauroyl peroxide, and
0.65 g of ethylhexyl thioglycolate.
Polymerization was carried out at about 70° C. Because of the vigorous reaction, the internal temperature rose to about 80° C. after just 10 minutes. The internal temperature was then maintained at 80° C. for 90 minutes, following which the batch was cooled to 25° C.

After the addition of 20 g of the dispersion of Example 7, diluted with water in the ratio of 1:1, the batch was acidified with 30 g of 10% sulfuric acid, following which it was stirred for 15 minutes at 25° C. It was then diluted with 500 g of distilled water and cooled to 20° C. The bead polymer was filtered off by suction and washed twice with 500 ml portions of distilled water.

After drying at room temperature, a free flowing bead polymer was obtained.

EXAMPLE 16

Non-blocking Soft Bead Polymer

The same mixture was used as in Example 15. 30 g of the dispersion of Example 5 was used for production of the beads. After drying at room temperature, a free flowing bead polymer was obtained.

TABLE 1

| | Characterization of bead polymers in accordance with the invention | | | | | | | | | | | | | | |
|---|---|---|---|---|---|---|---|---|---|---|---|---|---|---|---|
| | Composition of bead polymers* | | | | | $T_g$ of bead poly mer*** | Composition of dispersion* | | | | Dispersion solids/bead polymer | $T_g$ of dispersion*** | Evaluation of flow characteristics at** | | | Solubility in organic solvents (10% solution in |
| Ex. No. | MA | EA | MMA | BMA | VA | (°C.) | EA | MMA | BMA | IBMA | (%) | (°C.) | 30° (°C.) | 40° (°C.) | 45° (°C.) | methyl ethyl ketone) |
| 1 | — | 40 | 60 | — | — | 42 | | Untreated | | | | — | 3 | 4–5 | 6 | Clear |

TABLE 1-continued

Characterization of bead polymers in accordance with the invention

| Ex. No. | Composition of bead polymers* MA | EA | MMA | BMA | VA | $T_g$ of bead polymer*** (°C.) | Composition of dispersion* EA | MMA | BMA | IBMA | Dispersion solids/ bead polymer (%) | $T_g$ of dispersion*** (°C.) | Evaluation of flow characteristics at** 30° (°C.) | 40° (°C.) | 45° (°C.) | Solubility in organic solvents (10% solution in methyl ethyl ketone) |
|---|---|---|---|---|---|---|---|---|---|---|---|---|---|---|---|---|
| 8  | —   | 40 | 60 | —   | —  | 42 | 25 | 75  | —  | —   | About 1 | 64  | 1   | 1   | 1   | Clear |
| 9  | —   | 40 | 60 | —   | —  | 42 | 25 | 75  | —  | —   | 1       | 64  | 1   | 1   | 1–2 | Clear |
| 2  | —   | —  | 20 | 80  | —  | 34 | —  | —   | Untreated | — | —  | —   | 2–3 | 3–4 | 5   | Clear |
| 10 | —   | —  | 20 | 80  | —  | 34 | —  | —   | —  | 100 | 1       | 53  | 1   | 1   | 1–2 | Clear |
| 11 | —   | —  | 20 | 80  | —  | 34 | —  | 50  | 50 | —   | 1.4     | 58  | 1   | 1   | 1–2 | Clear |
| 12 | —   | —  | —  | 100 | —  | 20 | —  | 100 | —  | —   | 2       | 105 | 1   | 1   | 2–3 | Clear |
| 13 | —   | 60 | 40 | —   | —  | 19 | —  | 100 | —  | —   | 2       | 105 | 1   | 1   | 2–3 | Clear |
| 14 | 50  | —  | —  | —   | 50 | 19 | —  | 100 | —  | —   | 2       | 105 | 1   | 1   | 1–2 | Clear |
| 15 | 100 | —  | —  | —   | —  | 10 | 25 | 75  | —  | —   | 2.5     | 64  | 1   | 1–2 | 1–2 | Slightly turbid |
| 16 | 100 | —  | —  | —   | —  | 10 | —  | —   | —  | 100 | 3       | 53  | 1   | 2–3 | 4   | Slightly turbid |

MA = Methyl acrylate
EA = Ethyl acrylate
MMA = Methyl methacrylate
BMA = Butyl methacrylate
IBMA = Isobutyl methacrylate
VA = Vinyl acetate
*With regard to the amounts and types of the auxiliary agents used in the polymerization, refer to the directions for preparation.
**Key to ratings:
1 = Free-flowing
2 = Slightly agglomerated; readily broken up
3 = Agglomerated; readily broken up
4 = Agglomerated; difficult to break up
5 = Caked solid, but can be broken up
6 = Cannot be broken up without implements
***Calculated from the monomer composition.

What is claimed is:

1. A method for treating beads consisting essentially of a core of a first, softer, acrylic polymer prepared by a bead polymerization process and having a glass transition temperature below 70° C. to render such beads non-blocking, which method proceeds in the absence of a foaming agent and comprises depositing an adherent film of a second, harder, film forming polymer onto said beads from a dispersion of said second polymer, and then drying the treated beads, said second, harder, film forming polymer having a glass transition temperature which is at least 10° C. higher than that of said first, softer, polymer.

2. A method as in claim 1 wherein said soft polymer has a glass transition temperature below 50° C.

3. A method as in claim 1 wherein said dispersion is a dispersion of a polymer which does not form a film.

4. A method as in claim 1 wherein said polymer dispersion comprises a polymer comprising at least one ester of acrylic acid or of methacrylic acid.

5. A method as in claim 1 wherein said polymer dispersion contains less than 3 weight percent of emulsifiers, based on the polymer solids.

6. A method as in claim 1 wherein said polymer dispersion contains less than 1 weight percent of emulsifiers, based on the polymer solids.

7. A method as in claim 1 wherein said dispersion is stabilized with an emulsifier or emulsifiers effective only over a certain pH range.

8. A method as in claim 1 wherein the dry weight of polymer deposit on the bead polymer is from 0.2 to 20 weight percent of the dry weight of the bead polymer.

9. A method as in claim 1 wherein the dry weight of polymer deposit on the bead polymer is from 0.5 to 5 weight percent of the dry weight of the bead polymer.

10. A method as in claim 1 wherein said beads are first washed, then suspended in said dispersion having a solids content from 2 to 50 percent by weight, then separated and dried.

11. A method as in claim 1 wherein said beads are first washed, then suspended in said dispersion having a solids content from 5 to 20 percent by weight, then separated and dried.

12. A method as in claim 1 wherein said dispersion is added to a suspension of said bead polymer and polymer is deposited on the beads from said dispersion by precipitation.

13. A method as in claim 12 wherein said dispersion is added to said suspension at temperature above 25° C.

14. A method as in claim 12 wherein the precipitation of said polymer on said beads is effected by the presence of an acid.

* * * * *